United States Patent Office 2,740,817
Patented Apr. 3, 1956

2,740,817

METHYL-6-IONONES, METHYL-IRONES, AND THE LIKE AND PROCESS FOR PREPARING THE SAME

Yves-René Naves, Geneva, Switzerland, assignor to The Givaudan Corporation, a corporation of New Jersey No Drawing. Application February 4, 1948, Serial No. 6,360

3 Claims. (Cl. 260—587)

This invention relates to novel chemical products and to a novel process for preparing them.

The novel products of this invention possess desirable and characteristic odoriferous properties. They may be represented by their structural formula as follows:

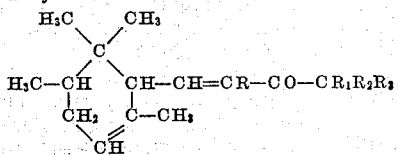

wherein R, R$_1$, R$_2$ and R$_3$ may be H or alkyl, alike or different. In addition to the alpha form, indicated by the foregoing representation, the novel products herein may exist in the beta form.

Accordingly, it will be understood that wherever the context so permits, the structural representation of the novel products of this invention as used in the description and claims herein is intended to include both the alpha and beta forms, as well as any and all stereoisomers thereof.

In general, the novel ketone products of this invention may be prepared by subjecting 3-methyl-geraniols or 3-methyl-nerols to an Oppenauer reaction in the presence of an excess of ketones having a radical alpha to the carbonyl group selected from CH$_2$ and CH$_3$, and then cyclizing the resulting condensation products. Reagents favoring the functional group exchange (Oppenauer reaction) act also as condensation agents, as in the case of the preparation of pseudoionones, Yamashita and Hango, Journal of the Chemical Society of Japan, 63, 1395 (1942).

Examples of specific ketones which may be employed are acetone and n-butanone.

The following examples illustrate the practice of my invention which however is not to be construed as limited to them.

EXAMPLE 1

*Preparation of 3-methyl-linalools (2,3,6-trimethyl-octadiene-2,7-ol-6)*

Pinacone hydrate was dehydrated by means of aniline hydrobromide in accordance with the method of Kyriakydes, J. A. C. S., 36, 991 (1914). The yield was 71 per cent of theory of 2,3-dimethyl-butadiene, as an easily polymerizable liquid, boiling at 70° C. to 71° C.

300 grams of the 2,3-dimethyl-butadiene were treated between —5° C. and 0° C. with a current of dry hydrogen bromide obtained by the combustion of 323 grams of bromine in an excess of hydrogen gas. The operation took two hours and thirty minutes. After 72 hours in the dark at 0° C., the product was fractionally distilled. There was obtained a 73 per cent of the theoretical yield of 1-bromo-2,3-dimethyl-butene-2, as a colorless, strongly lacrymose liquid having a boiling point of 65° C. to 66° C. under a pressure of 40 mm. of mercury; $d_4^{20}=1.2537$; $n_C^{20}=1.49049$; $n_D^{20}=1.49484$; $n_F^{20}=1.50539$; $(n_F-n_C)\times 10^4=149.0$; delta=118.9; RM$_D$=37.91 (calculated=37.205).

The bromo compound prepared as above was condensed with sodium ethyl acetoacetic ester in known manner. The resulting ketone, 2,3-dimethyl-heptene-2-one-6, was obtained in a yield of 88 per cent of theory on the basis of the bromo compound employed. The ketone is a colorless, mobile liquid having an odor similar to that of methyl-heptenone; a boiling point of 84° C. under 17 mm. of mercury pressure, $d_4^{20}=0.8634$; $n_C^{20}=1.44727$; $n_D^{20}=1.45022$; $n_F^{20}=1.45739$; $(n_F-n_C)\times 10^4=101.2$; delta=117.2; RM$_D$=43.63 (calculated=43.30).

In a liter round-bottom flask filled with nitrogen 33 grams of finely-pulverized sodamide and 430 cc. of dry ether were introduced. Then over a space of 100 to 120 minutes a mixture of 100 grams of the dimethyl-heptenone prepared as above and 450 cc. of ether were added, under vigorous stirring and at a temperature of 10° C. After three hours of agitation, the current of nitrogen was replaced with a current of pure and dry acetylene, the flask then being cooled down from about 10° C. to 15° C. to about 0° C. After twenty-four hours the product was poured over ice, washed, dried, freed of ether and fractionally distilled. There was isolated, after a few grams of the starting ketone, 102 grams (86.1 per cent of theory) of 2,3,6-trimethyl-octene-2-yne-7-ol-6, having a boiling point of 99° C. to 99.5° C. under a pressure of 10 mm. of mercury; $d_4^{20}=0.8888$; $n_C^{20}=1.46638$; $n_D^{20}=1.46932$; $n_F^{20}=1.47644$; $(n_F-n_C)\times 10^4=100.6$; delta=113.2; RM$_D$=52.18 (calculated=52.05).

C$_{11}$H$_{18}$O (166.254): Calculated: C, 79.45%; H, 10.67%; Found: C, 79.56%; H, 10.84%.

100 grams of the acetylenic alcohol prepared as above was mixed with 300 cc. of ethyl alcohol and about 7.5 grams of Raney nickel. The solution absorbed 15,000 cc. of hydrogen (20° C. and 730 mm. of mercury pressure) in 135 minutes, 50 per cent being absorbed in 68 minutes, 75 per cent in 102 minutes, and 90 per cent in 122 minutes.

The product was purified by distillation. The Raman spectra show that the resulting 2,3,6-trimethyl-octadiene-2,7-ol-6 is practically entirely free of the starting acetylenic alcohol. The properties of the product follow:

Boiling point—77° C. to 78° C. under a pressure of 3.6 mm. of mercury and 94° C. to 95° C. under a pressure of 10 mm. of mercury; $d_4^{20}=0.8737$; $n_C^{20}=1.46418$; $n_D^{20}=1.46708$; $n_F^{20}=1.47417$; $(n_F-n_C)\times 10^4=100.1$; delta=114.6; RM$_D$=53.41 (calculated=53.59).

C$_{11}$H$_{20}$O (168.270): Calculated: C, 78.49%; H, 11.99%. Found: C, 78.62%; H, 11.97%.

EXAMPLE 2

*Preparation of 3-methyl-geraniols (2,3,6-trimethyl-octadiene-2, 6-ol-8)*

53.5 grams of 3-methyl-linalools prepared as above were treated with 50 grams of acetic anhydride for eight hours on a steam bath and then refluxed for sixteen hours. The resulting mixture was fractionally distilled and yielded among other fractions 15.1 grams of a mixture having a boiling point of 66° C. to 68° C. under 5 mm. of mercury pressure; $d_4^{20}=0.8568$; $n_C^{20}=1.45364$; $n_D^{20}=1.45679$; $n_F^{20}=1.46442$; $(n_F-n_C)\times 10^4=107.8$; and 19.1 grams of a mixture of esters consisting of the acetate of 3-methyl-geraniols (3-methyl-nerols) having a boiling point of 98° C. to 104° C. under a pressure of 4 mm. of mercury; $d_4^{20}=0.9531$ to 0.9497 and $n_D^{20}=1.4556$ to 1.4658.

The latter product was saponified by refluxing in contact with an alcoholic solution of potassium hydroxide. The resulting alcoholic fraction (17.4 grams) was treated with 20 grams of phthalic anhydride over a period of four hours in the presence of boiling benzene. The phthalates were saponified to regenerate the alcohols and 6.4 grams of alcohol having the following properties were obtained:

Boiling point—93° C. to 94° C. under a pressure of 2 mm. of mercury or 119° C. to 120° C. under a 10 mm. mercury pressure; $d_4^{20}=0.8919$; $n_C^{20}=1.47818$; $n_D^{20}=1.48142$; $n_F^{20}=1.48928$; $(n_F-n_C)\times 10^4=111.0$; delta=124.5; $RM_D=53.69$ (calculated=53.59).

EXAMPLE 3

*Preparation of 3-methyl-pseudo-ionones (pseudo-α-irones) (2,3,6-trimethyl-undecatriene-2,6,8-one-10)*

A mixture of 200 grams of 3-methyl-geraniols prepared as in Example 2, 1000 grams of dry acetone and 300 grams of aluminium-tertiary-butylate prepared in accordance with Oppenauer's method was refluxed under atmospheric pressure for 80 hours. The excess acetone and the isopropyl alcohol formed were distilled up to the point where the temperature of the vapor was 70° C. The residue was cooled and 500 cc. of benzene were added. A 20 per cent aqueous solution of sulfuric acid was added until the contents were slightly acid. The benzene layer was washed until neutral and the benzene was removed by distillation. The residue was steam-distilled under reduced pressure and the oily distillate was dried and fractionally distilled. 170 grams (69.4 per cent of theory) of a mixture of 3-methyl-pseudo-ionones were obtained. The properties of the product obtained were as follows:

Boiling point—125° C. to 127° C. at 3 mm. of mercury pressure; $d_4^{20}=0.9005$ to $0.9024$; $n_D^{20}=1.5320$ to $1.5348$; ketone content by oximation=97.4 to 99.2.

EXAMPLE 4

*Preparation of methyl pseudo irones*

A mixture of 100 grams of 3-methyl-geraniols prepared as in Example 2, 600 grams of dry n-butanone and 125 grams of aluminium-tertiary-butylate prepared in accordance with Oppenauer's method was refluxed under atmospheric pressure for 80 hours. The excess of butanone and the secondary butyl alcohol formed were distilled, 300 cc. of benzene were added to the residue and a 20 per cent aqueous sulfuric acid solution was added until the contents were slightly acid. The benzene layer was washed until neutral and the benzene was distilled off. The residue was steam-distilled under reduced pressure and the oily distillate was fractionally distilled. A yield of 56 grams of a mixture of methyl-pseudo-irones was obtained. It had a boiling point of 130° C. to 132° C. under a pressure of 2.6 mm. of mercury; $d_4^{20}=0.9039$; $n_D^{20}=1.5257$; and titrated 97.6 per cent by oximation.

EXAMPLE 5

*Preparation of 6-methyl-ionones (α-irones) (1,1,3,6-tetramethyl-2-[butene-2¹-one-2³]-cyclohexene-3)*

A 100 grams of a mixture of 3-methyl-pseudo-ionones prepared as above were added a little at a time over a period of 30 minutes under vigorous agitation to 300 grams of orthophosphoric acid (85 per cent) while maintaining a temperature of 30° C. The temperature is raised to 35° C. over a period of 30 minutes following the addition and then the contents are poured into a liter of water. The next day the contents are extracted with benzene and the benzene extract is washed until neutral and then distilled to remove the benzene. The residue is steam-distilled under reduced pressure and the oily distillate is decanted, dried and fractionally distilled. There is obtained a forerun of 3-methyl-pseudo-ionones and then 72 grams of a mixture of 6-methyl-ionones substantially all being the alpha form. The other properties were as follows:

Boiling point=109° C. to 112° C. under a pressure of 3.2 mm. of mercury; $d_4^{20}=0.9343$ to $0.9364$; $n_D^{20}=1.4985$ to $1.5026$.

B 100 grams of a mixture of 3-methyl-pseudo-ionones prepared as above were slowly added over a period of 10 minutes to 400 grams of sulfuric acid (50 Baumé), under vigorous stirring. The temperature rose to 50° C. in five minutes following the addition. The mixture was poured over 500 grams of crushed ice and extracted with benzene. From this point the procedure was the same as in (A) above.

69.5 grams of 6-methyl-ionones having substantially the same properties as those given in (A) were obtained.

50 grams of a mixture of 6-methyl-ionones prepared in accordance with the foregoing were treated with 38 grams of 4-phenyl-semicarbazide in the presence of a mixture of 100 cc. of alcohol (70 per cent) and 20 cc. of acetic acid, at 40° C. over a period of ten minutes. The contents were left to stand at room temperature and after 48 hours 200 cc. of water were added. The 4-phenyl-semicarbazone was filtered and recrystallized from alcohol (95 per cent) and yielded 72 grams (87.5 per cent of theory on the basis of the 6-methyl-ionone used) of a 4-phenyl-semicarbazone melting at 174.5° C. to 175° C.

25 grams of 4-phenyl-semicarbazone, 30 grams of phthalic anhydride, 60 grams of water and 140 grams of ethylene glycol were heated in an apparatus for continuous distillation. After 30 hours 13.6 grams of 6-methyl-alpha-ionone (86 per cent of theory) were obtained. It had a boiling point of 108° C. to 109° C. under a pressure of 3 mm. of mercury; $d_4^{20}=0.9346$; $n_D^{20}=1.5013$.

EXAMPLE 6

*Preparation of methyl-irones*

A 60 grams of a mixture of methyl-pseudo-irones prepared in accordance with the above were added little by little under vigorous agitation to 150 grams of orthophosphoric acid (85 per cent) while maintaining the temperature of the contents at 30° C. The temperature was raised to 35° C. during the ensuing 30 minutes and the contents were then poured into 500 cc. of water. The next day the contents were extracted with benzene; the benzene extract was washed until neutral; the benzene was distilled off, and the residue was steam-distilled under reduced pressure.

The oily distillate was decanted, dried and fractionally distilled. After a small forerun of methyl-pseudo-irones there was obtained 42 grams of a mixture of methyl-irones substantially all of it being the alpha isomers, and having a boiling point of 107° C. to 110° C. under a pressure of 1.8 mm. of mercury; $d_4^{20}=0.9362$; and $n_D^{20}=1.4999$.

This mixture when treated with semicarbazide acetate in accordance with the usual conditions gives a mixture of semicarbazones. Recrystallization from methyl alcohol yields 70 per cent of a semicarbazone melting at 214° C. to 216° C.

10 grams of the semicarbazone were hydrolyzed under agitation at room temperature with dilute sulfuric acid. The regenerated ketone is purified by steam-distillation under reduced pressure and rectified by distillation. 6 grams of pure ketone having a boiling point of 109° C. to 110° C. under a pressure of 1.9 mm. of mercury, $d_4^{20}=0.9376$, and $n_D^{20}=1.5015$ were obtained.

B 50 grams of a mixture of methyl-pseudo-irones prepared in accordance with the foregoing were added little by little over a period of 10 minutes to 200 grams of sulfuric acid (50° Baumé), under vigorous stirring. The temperature then rose to 50° C. in 5 minutes without stopping agitation. The mixture was poured over 500 grams of crushed ice, extracted with benzene and then treated in accordance with the preceding Example 6 (A).

There was finally obtained, in addition to recovered methyl-pseudo-irones, 27.2 grams of a mixture of methyl-irones substantially all of which were the alpha form. The other properties were substantially the same as those given for the methyl-irones in Example 6 (A).

The foregoing illustrates the invention, which however is not to be limited thereby and limited solely by the appended claims.

I claim:

1. The process which comprises subjecting 3-methyl geraniols stereoisomers at an elevated temperature to an Oppenauer reaction in the presence of an excess of a member selected from the group consisting of acetone and n-butanone, and cyclizing the resulting condensation product in the presence of 50° Baumé sulfuric acid.

2. A process for making products selected from the group consisting of those having the structural formula:

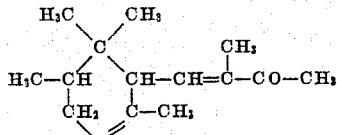

and

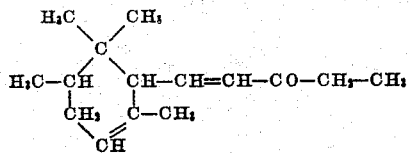

which comprises subjecting 3-methyl geraniols stereoisomers at an elevated temperature to an Oppenauer reaction in the presence of an excess of n-butanone, whereby the 3-methyl citrals formed condense with the n-butanone and cyclizing the resulting condensation product in the presence of 50° Baumé sulfuric acid.

3. A process for making alpha-irone, which comprises subjecting 3-methyl geraniols stereoisomers at an elevated temperature to an Oppenauer reaction in the presence of an excess of acetone, and cyclizing the resulting condensation product in the presence of 50° Baumé sulfuric acid.

References Cited in the file of this patent

UNITED STATES PATENTS

| 556,943 | Tiemann | Mar. 24, 1896 |
| 2,308,192 | Mikeska et al. | Jan. 12, 1943 |

OTHER REFERENCES

Ruzicka et al.: Helv. Chim. Acta, vol. 23, pp. 959–974 (1940).

Masataro Yomashita & Hirozo Honjo, J. Chem. Soc. Japan, vol. 63, pp. 1335–1337 (1942), abstracted in Chem. Abstracts, vol. 41, cols. 3041–3042 (1947).

Royals: Ind. Eng. Chem., vol. 38, pp. 546–548 (1946).

Naves: Grampoloff and Bachmann, Helv. Chim. Acta, vol. 30, pp. 1599–1613, October 15, 1947.